(12) United States Patent
Attaluri

(10) Patent No.: US 6,748,377 B1
(45) Date of Patent: Jun. 8, 2004

(54) FACILITATING QUERY PUSHDOWN IN A MULTI-TIERED DATABASE ENVIRONMENT

(75) Inventor: Gopi K. Attaluri, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 09/691,468

(22) Filed: Oct. 18, 2000

(51) Int. Cl.$^7$ ............................................... G06F 17/30
(52) U.S. Cl. ........................... 707/4; 707/5; 707/103 R
(58) Field of Search .............................. 707/201, 1, 10, 707/3, 103 R, 102, 101, 8, 2, 5, 4, 104.1

(56) References Cited

U.S. PATENT DOCUMENTS

| | | | | |
|---|---|---|---|---|
| 5,511,186 A | * | 4/1996 | Carhart et al. | 707/2 |
| 5,551,027 A | | 8/1996 | Choy et al. | 707/201 |
| 5,574,900 A | | 11/1996 | Huang et al. | 707/1 |
| 5,588,150 A | | 12/1996 | Lin et al. | 707/1 |
| 5,590,321 A | | 12/1996 | Lin et al. | 707/10 |
| 5,659,725 A | * | 8/1997 | Levy et al. | 707/3 |
| 5,737,591 A | | 4/1998 | Kaplan et al. | 707/1 |
| 5,742,806 A | * | 4/1998 | Reiner et al. | 707/3 |
| 5,829,006 A | * | 10/1998 | Parvathaneny et al. | 707/101 |
| 5,875,446 A | | 2/1999 | Brown et al. | 707/3 |
| 5,926,809 A | * | 7/1999 | Szalwinski | 707/3 |
| 6,134,540 A | * | 10/2000 | Carey et al. | 707/2 |
| 6,219,663 B1 | | 4/2001 | Baxter et al. | 707/3 |

FOREIGN PATENT DOCUMENTS

EP 877328 A2 * 11/1998 ........... G06F/17/30

OTHER PUBLICATIONS

From Internet: Novell "SQL Integrator Product Overview", http://webapps.novell.com/text/products/sqli/overview.html, ©1998.

* cited by examiner

Primary Examiner—Jean M. Corrielus
Assistant Examiner—Gwen Liang
(74) Attorney, Agent, or Firm—Gates & Cooper LLP (57) ABSTRACT

A query pushdown system determines whether all, some or none of the query predicates of an object-oriented query received at an object level of a database may be executed in a relational level of the database. The determined query predicates are pushed down to the relational level and executed in the relational level. The results of the query execution are transferred to the object level. In addition, data sets corresponding to query predicates that could not be executed in the relational level are also transferred to the object level. Any results and data sets are applied to the remaining query predicates which are executed in the object level.

87 Claims, 5 Drawing Sheets

FACILITATING QUERY PUSHDOWN IN A MULTI-TIERED DATABASE ENVIRONMENT

BACKGROUND OF THE INVENTION

1. Field of the Invention

This invention relates in general to computer-implemented database systems, and, in particular, to a technique for determining when to push down query predicates from a first tier of a database environment to a second tier of the database environment and executing the pushed down query predicates in the second tier.

2. Description of Related Art

Databases are computerized information storage and retrieval systems. A relational database management system (RDBMS) is a database management system (DBMS) which uses relational techniques for storing and retrieving data. Relational databases are organized into tables which consist of rows and columns of data. The rows are formally called tuples. The tuples and columns form tables. A database will typically have many tables and each table will typically have multiple tuples and multiple columns. The tables are typically stored on direct access storage devices (DASD), such as magnetic or optical disk drives for semi-permanent storage.

In a RDBMS, data records are stored in table spaces. A table space may contain one or more tables. Each table space contains a number of space map pages. Each space map page covers a number of data pages. One or more records can be stored in a single data page. All data pages within a single table space must have the same page size. Typically, a page contains 4096 bytes.

In a multi-system environment, multiple computers are connected by a network to each other and to shared data storage devices (e.g., disks). In this system, the independently operating computers use storage consisting of one or more DASDs. Each computer system includes a DBMS which provides access to databases stored on the DASD-oriented external storage subsystem.

The RDBMS may execute requests for objects or tables using the Standard Query Language (SQL). RDBMS software using a SQL interface is well known in the art. The SQL interface has evolved into a standard language for RDBMS software and has been adopted as such by both the American National Standards Institute (ANSI) and the International Standards Organization (ISO).

The SQL interface allows users to formulate relational operations on the tables either interactively, in batch files, or embedded in host languages, such as C and COBOL. SQL allows the user to manipulate data. The definitions for SQL provide that a RDBMS should respond to a particular query with a particular set of data given a specified database content, However, the technique that the RDBMS uses to actually find the required information in the tables on the disk drives may be determined by the RDBMS. Typically, there will be more than one technique that can be used by the RDBMS to access the required data. The RDBMS will optimize the technique used to find the data requested in a query in order to minimize the computer time used and, therefore, the cost of performing the query.

In an Object-Oriented Database (OODB), the database is organized into objects having members that can be pointers to other objects. The objects contain references, and collections of references, to other objects in the database, thus leading to databases with complex nested structures. Contrary to a RDBMS, an Object-Oriented DBMS (OODBMS) can not be manipulated using the SQL language. Rather, the OODBMS utilizes a language that is directed to object, not relational databases, but still uses some of the SQL terms. This language will be referred to as Object-Oriented SQL (OOSQL), although this language is not a standard language as SQL is. OOSQL executes within the OODBMS and is not interchangeable with SQL.

The integration of object technology and relational database systems has been an active area of research for the past decade. One important aspect of the integration of these two technologies is the provision of efficient, declarative query interfaces for accessing and manipulating object data. Database environments based on SQL and capable of processing object-oriented queries with OOSQL to retrieve specified sets of data in the RDBMS may be distributed among a number of different tiers or levels of a database. Database environments are often structured into multiple levels because these structured environments can be more flexible, permit users to modify data in one tier without modifying data in other tiers, and facilitate load balancing since application functions are separate from database functions. For example, a database environment may be configured with two levels. The first level may be configured to execute object-oriented queries with OOSQL to manipulate an object or object data. The second level may be a relational level, based on SQL, in which an RDBMS resides. The RDBMS may retrieve specified sets of data based on the queries received from the first level and provide certain information to the first level in response to the query.

The object-oriented level of the multi-tiered database receives a query to manipulate an object, object data or other data stored on a RDBMS. The query may be comprised of a number of query predicates or components, some of which are directed to the relational level and others directed to the object level. In conventional systems, query predicates may be pushed down to and executed in the relational level, if all of the query predicates conform to a relational format executable in the RDBMS. In this case, the query is executed in the relational level, and a query result is transferred to the object level. A query may limit the data to be retrieved; for example, a query may request all employee records for employees whose salaries are less than $50,000. In this case, the query result that is returned includes only records for employees whose salaries are less than $50,000 and does not include records for employees whose salaries are equal to or greater than $50,000.

On the other hand, if none of the query predicates are executable in the relational level, then only a data set (rather than a query result) corresponding to each predicate is transferred from the relational level to the object level. A data set refers to data in the database. For example, if a query requests all employee records for employees whose salaries are less than $50,000, and the query cannot be pushed down to the relational level, all employee records are returned to the object level to be processed. Thus, in this case, the relational level serves as a source of a data set which is applied to the query in the object level.

Similarly, if only some of the query predicates conform to the relational level, then the relational data sets corresponding the query are also sent to the object level and applied to the query in the object level.

In summary, in conventional systems, if a query includes any predicates which are not executable in relational space, then none of the predicates can be pushed down to and executed in the relational level. Rather, data sets are simply transferred from the relational level to the object level and applied to the query in the object level. Consequently, more data is transferred across the network to the object level. As a result, the object level must process more data, query processing times are increased and system performance is diminished.

Therefore, there is a need in the art for a technique that pushes down more query predicates to the relational level such that these predicates can be processed in the relational level to reduce data flow across the network, reduce query processing times, and enhance system performance.

A SUMMARY OF THE INVENTION

To overcome the limitations in the prior art described above, and to overcome other limitations that will become apparent upon reading and understanding the present specification, the present invention discloses a method, apparatus, and article of manufacture for executing a query against a multi-tiered database environment.

In accordance with the present invention, a query with one or more original predicates is received at a first level of the multi-tiered database. At the first level, a determination of which original query predicates can be executed in a second level of the multi-tiered database is performed. The determined query predicates are executed in the second level.

BRIEF DESCRIPTION OF THE DRAWINGS

Referring now to the drawings in which like reference numbers represent corresponding parts throughout.

DETAILED DESCRIPTION

In the following description of embodiments of the invention, reference is made to the accompanying drawings which form a part hereof, and which is shown by way of illustration specific embodiments in which the invention may be practiced. It is to be understood that other embodiments may be utilized as structural changes may be made without departing from the scope of the present invention.

Facilitating Query Pushdown System In A Multi-Tiered Database Environment

Figure 1:
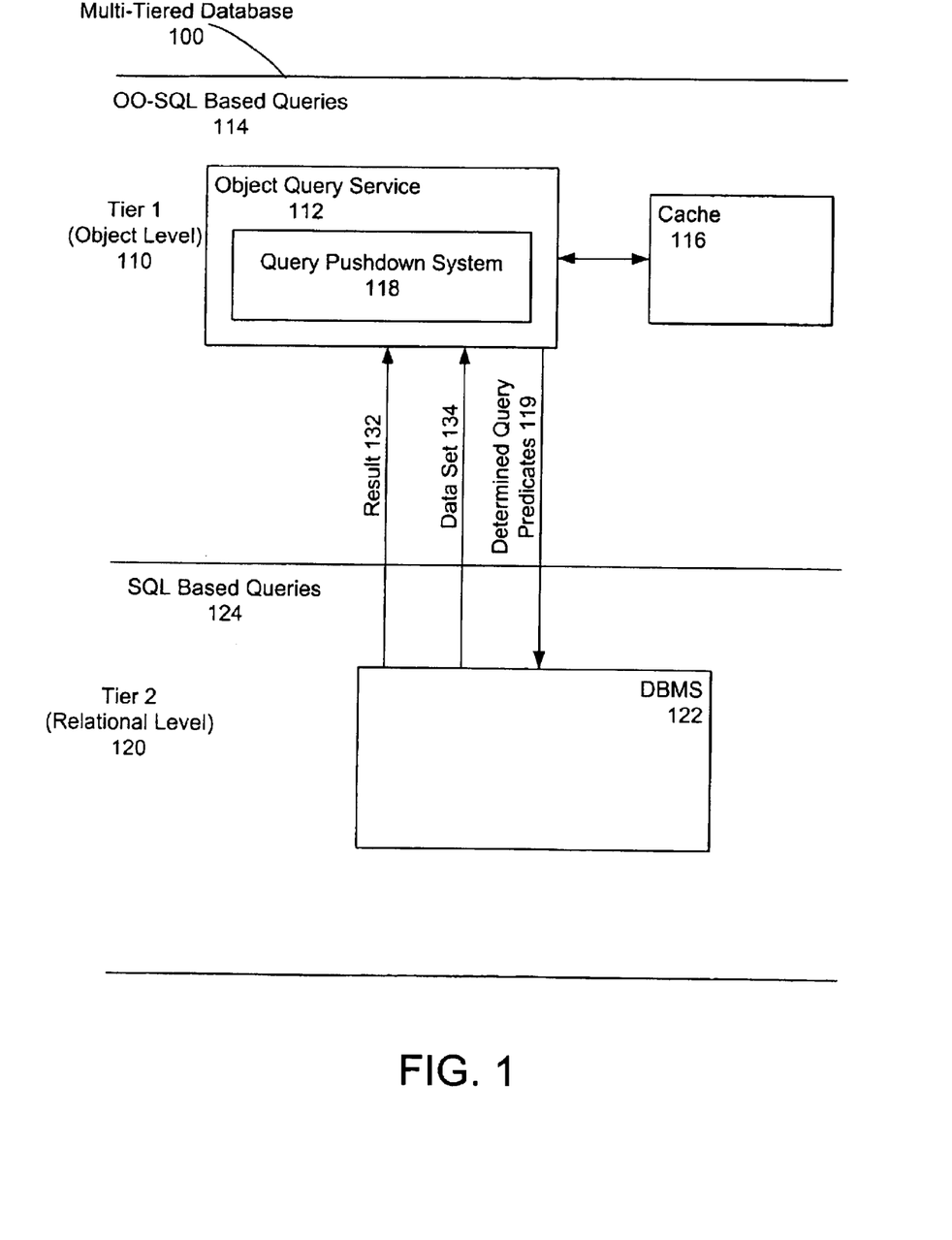
FIG. 1 is a block diagram of a multi-tiered database environment incorporating the query pushdown system.

FIG. 1 illustrates a high level view of one environment in which the present invention executes. The functional high level diagram illustrates a computer environment, for example, a multi-tiered database 100. For purposes of illustration, the multi-tiered database 100 is shown as two tiers or levels—a first level 110 and a second level 120. The first level 110 may be an object-oriented level ("object level") which utilizes, for example, an Object-Oriented Standard Query Language ("OOSQL"). The second level 120 may be a relational level ("relational level") based on, for example, Standard Query Language ("SQL"). Those skilled in the art, however, will recognize that the present invention may be implemented in database environments having more than two levels and that these levels may be arranged in various configurations.

The object level 110 includes an object query service 112 that processes object-oriented queries 114. The object level 110 may also include cache memory 116 which may be coupled to or associated with the object query service 112 and/or the query pushdown system 118. Cache memory 116 enables data to be transferred between the object level 110 and the relational level 120 directly or indirectly through cache memory 116. For simplicity, the specification will refer to the query pushdown system 118 as receiving or transmitting data rather than cache memory 116. The query pushdown system 118 determines which queries are to be pushed down to the relational level 120 and then pushes down those determined query predicates 119 to the relational level 120 to be processed.

The object level 110 and the relational level 120 are connected via a network. Determined query predicates 119 are transferred from the object level 110 over the network and executed in the relational level 120. The results 132 of executing the determined query predicates 119 and any other requested data sets 134 are transferred back over the network from the relational level 120 to the object level 110 and applied to remaining query predicates in the object level 110. In one embodiment, the specification refers to a "result" 132 as the result of a query predicate execution in the relational level 120 and a "data set" 134 as the data set transferred from the relational level 120 to the object level 110 when a query predicate is not executable in the relational level 120. For example, assume a predicate is to process data from a table consisting of 100 employee names. If the query predicate is executed in the relational level 120 to select employee names for employees whose salary is less than $50,000, the relational level 120 may return a result 132 of, for example, 20 employee names for employees whose salary is less than $50,000. However, if the predicate can not be executed in the relational level 120, then the data set 134 consisting of all 100 employee names is returned to the object level 110. It is understood that in other embodiments, a result set may include both the result 132 of a query predicate execution in the relational level 120 and any data sets 134 transferred from the relational level 120.

Figure 2:
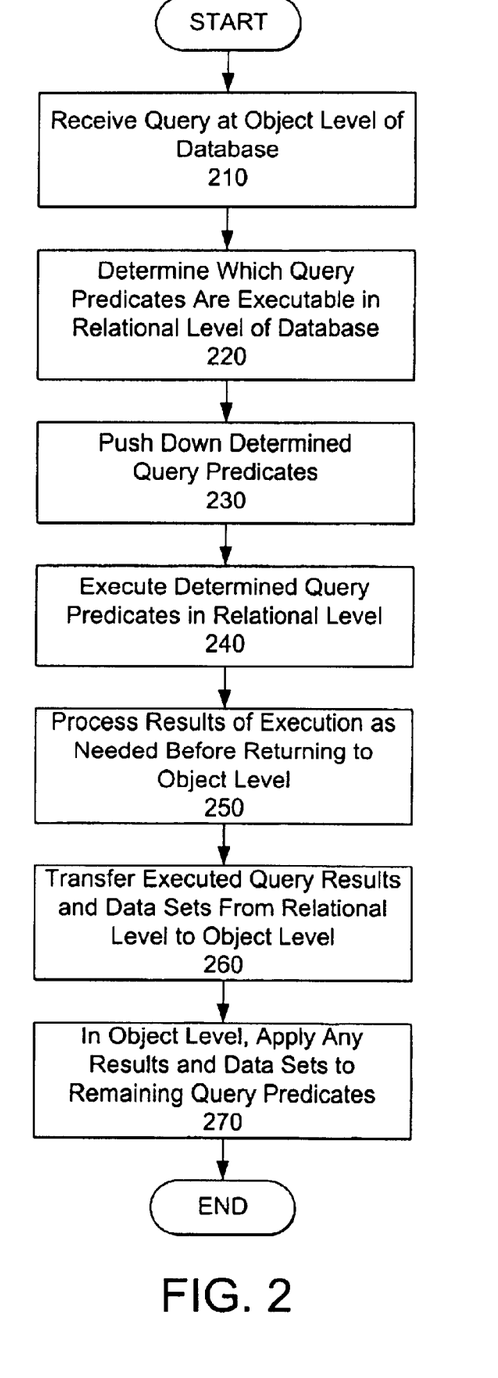
FIG. 2 is a flow diagram illustrating tasks performed by the query pushdown system.

FIG. 2, a flow diagram illustrating the technique used by the query pushdown system 118, generally illustrates how query processing tasks are allocated between the object level 110 and the relational level 120 of the multi-tiered database 100. More specifically, in block 210, the query pushdown system 118 receives an object-oriented query 114 at the object level 110 of the multi-tiered database 100. In block 220, the query pushdown system 118 determines which query predicates of the object-oriented query 114 are executable in the relational level 120. In block 230, the query pushdown system 118 pushes the determined query predicates 119 down from the object level 110 to the relational level 120. In block 240, the determined query predicates 119 are executed in the relational level 120 by a DBMS 122. In block 250, the results 132 are processed, as needed, before the results 132 are returned to the object level 110. In block 260, DBMS 122 transfers the results 132 and any retrieved data sets 134 from the relational level 120 to the object level 110. In block 270, the query pushdown system 118 executes query predicates 114 remaining in the object level 110 and applies any results 132 and retrieved data sets 134 to the remaining query predicates. This technique is described in further detail below.

In block 210 of FIG. 2, the object query service 112 and/or the query pushdown system 118 receives an object-oriented query 114 at the object level 110. The object-oriented query 114 may be formatted in an object-oriented language such as Object-Oriented Standard Query Language (OOSQL). OOSQL is similar to Standard Query Language (SQL) with the exception that OOSQL includes additional operators to manipulate objects and object data within an object space. Thus, relational databases and applications based on SQL can not execute OOSQL queries because relational databases are not configured to process the object-oriented operators. The following are three examples of OOSQL queries:

1. select e.no from empClass e where e.no>1
2. select e.no from empClass e where e.add1( )>1
3. select e.no from empClass e where e.no>1 and e.add1 ( )>1

In these examples, the "select" command specifies the data to be returned from the specified class which will be in the final result class. For comparison, in SQL, tables are used, not classes. The "from" key word specifies the class from which the specified data is selected based on the conditions in the "where" clause. In other words, the "where" clause specifies one or more predicates. Each predicate specifies a condition; that is, each predicate has a relational operator (e.g., >, <, =, etc.) and compares two values. The result class then consists of the data of the selected class for which the search conditions are true. Although object-oriented queries 114 are executable in the object level 110, some components or predicates of the object-oriented queries 114 may be executed in the relational level 120.

The first example object-oriented query selects "e.no" (e.g., employee number) from the employee class "e" based on the condition that the employee number is greater than 1. The second example object-oriented query selects e.no from an employee class "e" when the value returned by executing the method "e.add1 ( )" is greater than 1. The third example object-oriented query selects "e.no" from the employee class "e" based on the condition that the employee number is greater than 1 and that the method "e.add1 ( )" return values or results greater than 1.

In block 220, the query pushdown system 118 determines which predicates of the object-oriented query 114 can be pushed down to the relational level 120 and executed in the relational level 120. The query pushdown system 118 makes this determination by associating the "where" clause of the object-oriented query 114 with a corresponding boolean expression embodied in a predicate tree structure. After creating a tree structure, the query pushdown system 118 identifies the pushdown preference of the query predicates of the object-oriented query 114 and determines whether any query predicates have already been assigned a pushdown preference based on the execution of lower level predicates.

Figure 3:
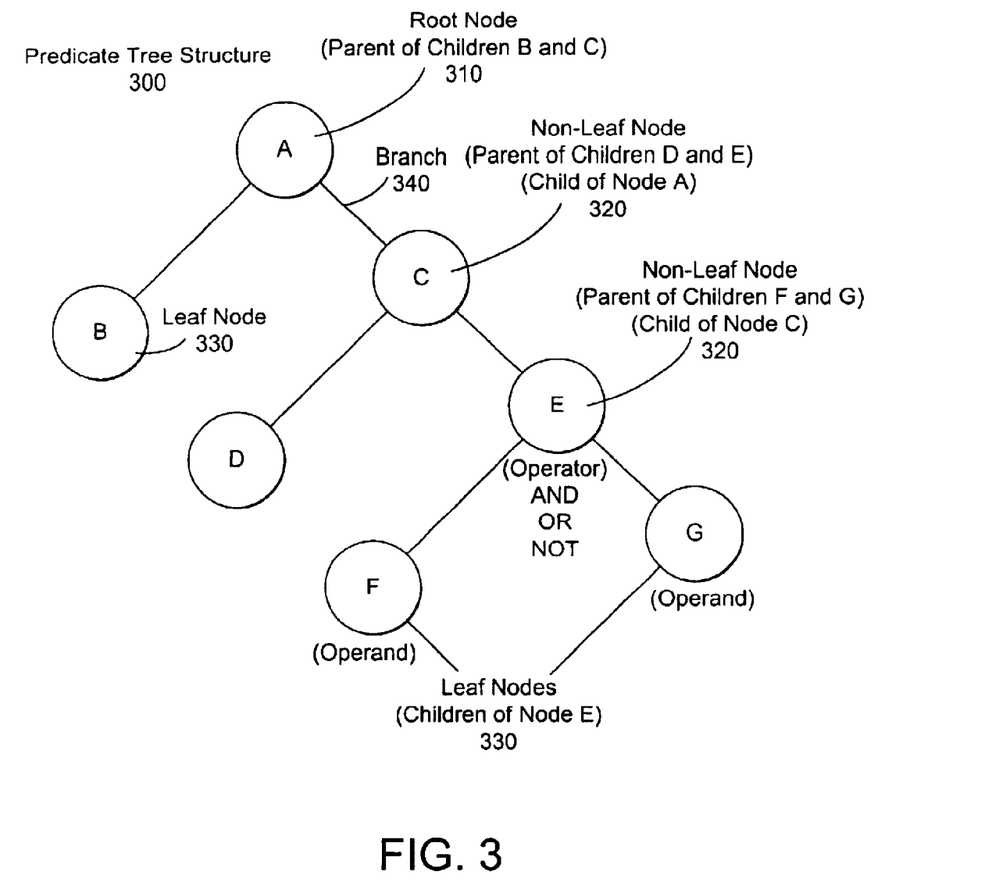
FIG. 3 is a diagram illustrating a tree structure and parent-child node relationships used by the query pushdown system.

For reference, FIG. 3 illustrates a predicate tree structure or predicate tree 300 and parent node and child node relationships utilized by the query pushdown system 118. A predicate tree 300 is a data structure in which each element is attached to zero or more elements directly beneath it. More specifically, a root node 310 may be attached to zero or more non-leaf nodes 320 or leaf nodes 330 via branches 340. In other words, a first node above a second node may be the parent node of the lower child node. The elements or child nodes at the very bottom of the tree 300 are leaf nodes 330 which do not have any members attached beneath them.

The root node 310 represents an entire "where" clause of an object-oriented query 114. The root node 310 may, for example, be considered to be the "parent" of one or more "child" nodes which may be either non-leaf nodes 320 or leaf nodes 330. As illustrated in FIG. 3, root node 310 (node A) is the parent node of a child leaf node 330 (node B) and a child non-leaf node 320 (node C). Similarly, non-leaf node 320 (node C) is the parent node of child leaf nodes 330 (node D and E), and so on. It is to be understood that although FIG. 3 only illustrates a parent node with two child nodes, a parent node may have any number of child nodes based on the tree structure 300 representing the where clause. In other words, the where clause may be expressed as a series of any number of non-leaf nodes 320 and leaf nodes 330 in various configurations.

Thus, a non-leaf node 320 in the predicate tree 300 is associated with a relational operator that joins lower level non-leaf nodes 320 and/or leaf nodes 330. Leaf nodes 330 of the tree, which have no other members beneath them, represent atomic predicates. Referring to the previous sample OOSQL queries, examples of atomic predicates include "e.no >1" and "e.add1 ( )>1". In addition, a leaf node 330 may be relational or object-oriented. A relational leaf node 330 can be expressed in SQL and can be evaluated in the relational level 120. For example, a relational leaf node 330 may represent the "e.no >1" predicate. An example of an object leaf node 330 which can only be evaluated in the object level 110 includes the "e.add1 ( )>1" predicate.

After creating a predicate tree 300, the determination of which query predicates of the object oriented query 114 are pushed down to the relational level 120 is accomplished by partially normalizing the predicate tree 300 into query groups that may be executed in the object level 110 and query groups that may be executed in the relational level 120. In partial normalization, a node is normalized if it is "partially" pushed down to the relational level 120. This avoids unnecessary normalization. Those skilled in the art will recognize that normalization refers to converting a predicate calculus expression into an equivalent form with a conjunction of disjunctive terms. The expression (A OR B) AND (C OR D) is an example of a conjunction of disjunctive terms. Terms A, B, C, and D are all leaf nodes in the normalized expression. Each of the leaf nodes may or may not be subject to a negative operator. In this case, partial normalization refers to an incomplete normalization.

Determining which query predicates to push down to the relational level 120 is based on whether query predicates may be executed in the relational level 120. A pushdown preference indicates to what extent the query predicates of each object-oriented query 114 can be pushed down to and processed in the relational level 120. The pushdown preference may be "complete", "partial", or "zero". A complete pushdown preference indicates that all of the query predicates can be pushed down to the relational level 120. A partial pushdown preference indicates that some, but not all of the query predicates can be pushed down to the relational level 120. Mathematically, this means that the node can be converted to an equivalent expression of the form A AND B where the pushdown preference for A is "complete" and the pushdown preference for B is "zero". A zero pushdown preference indicates that none of the query predicates can be executed in the relational level 120.

Ideally, the pushdown preference of every object-oriented query 114 would be "complete" such that all of the query predicates may be pushed down to and executed in the relational level 120. This would allow only the results 132 to be transferred back to the object level 110. Pushing down as many query predicates as possible to the relational level 120 eliminates the need to transfer data sets 134 over the network and the need to process the data sets 134 in the object level 110 to obtain query results. Most object-oriented queries 114, however, contain "where" clauses with query predicates that are executable in both the object level 110 and the relational level 120.

The present query pushdown system 118 pushes down as many query predicates as possible to the relational level 120, even in situations in which the "where" clause includes query predicates that are to be evaluated in both levels. In this case, the predicates that may be executed in the relational level 120, the "determined query predicates" 119, are pushed down to and executed in the relational level 120. The results 132 of the execution are then transferred to the object level 110. As a result, the query pushdown system 118 overcomes the shortcomings of conventional systems by minimizing data sets 134 transferred over the network, reducing network activity, reducing query processing times in the object level 110, and improving overall system performance.

Figure 4:
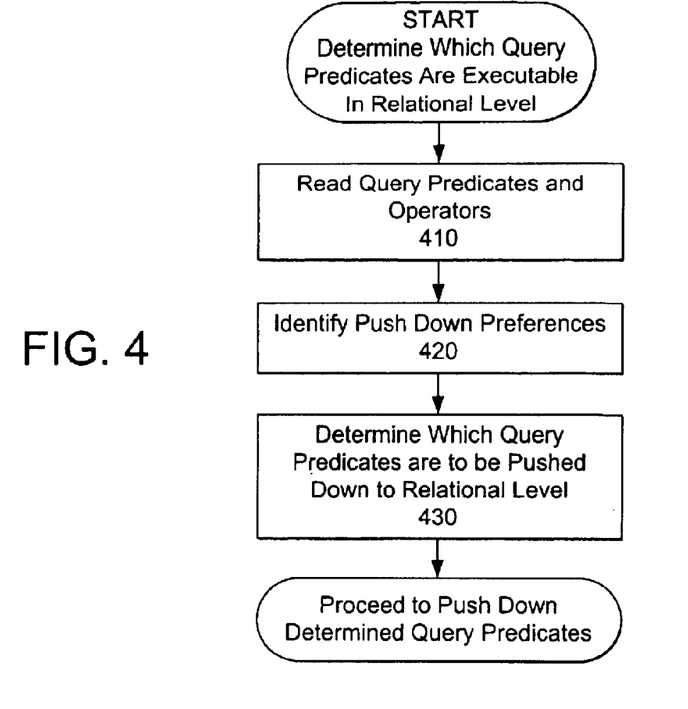
FIG. 4 is a flow diagram illustrating tasks performed by the query pushdown system in determining which query predicates are executable in the relational level of the database.

FIG. 4 is a flow diagram illustrating the general tasks involved in determining which query predicates can be evaluated in the relational level 120 based on the corresponding boolean expression embodied in the tree 300. In block 410, the query pushdown system 118 reads the query predicates of the 'where' clause of an object-oriented query 114. In block 420, the query pushdown system 118 identifies the pushdown preference of each query predicate represented by one or more nodes in the predicate tree 300. The following pseudo-code performs these tasks:

1. ASSIGN COMPLETE PUSHDOWN PREFERENCE OR ZERO PUSHDOWN PREFERENCE TO EACH LEAF NODE DEPENDING ON WHETHER PREDICATE CAN BE EXECUTED IN RELATIONAL LEVEL.

2. AT LEVEL 1, ABOVE LEAF NODE, DETERMINE PUSHDOWN PREFERENCE BASED ON OPERATOR [AND, OR] WITHIN NONLEAF NODE AND PUSHDOWN PREFERENCE OF CHILDREN LEAF NODES.

3. STARTING WITH LEVEL 2 AND UP TO ROOT LEVEL, DETERMINE PUSHDOWN PREFERENCE BASED ON OPERATOR IN THE NODE AND PUSHDOWN PREFERENCE OF CHILDREN NODES.

The pushdown preference of query predicates is identified by associating the "where" clause of the object-oriented query 114 with a corresponding boolean tree structure 300 based on root nodes 310, non-leaf nodes 320, and leaf nodes 330. If a node is at a higher level than another node, the higher node may be considered to be a "parent" to the lower "child" node. For example, with reference to FIG. 3, a pushdown preference of non-leaf node 320 ("C"), is determined by its two children or operands, leaf nodes 330 ("D" and "E") and the operator joining B and C. With conjunctive and disjunctive operators, the query predicate represented by the non-leaf node A and two leaf nodes B and C generates various boolean permutations which determine the pushdown preference of the query predicate. The following description and FIGS. 5 and 6 explain in detail the tasks are performed by the query pushdown system 118 when nodes are associated with conjunctive and disjunctive operators.

Pushdown Preference Of Query Predicate Represented By Parent Node Associated With Child Nodes Subject To Conjunctive Operator (A=B AND C)

Figure 5:
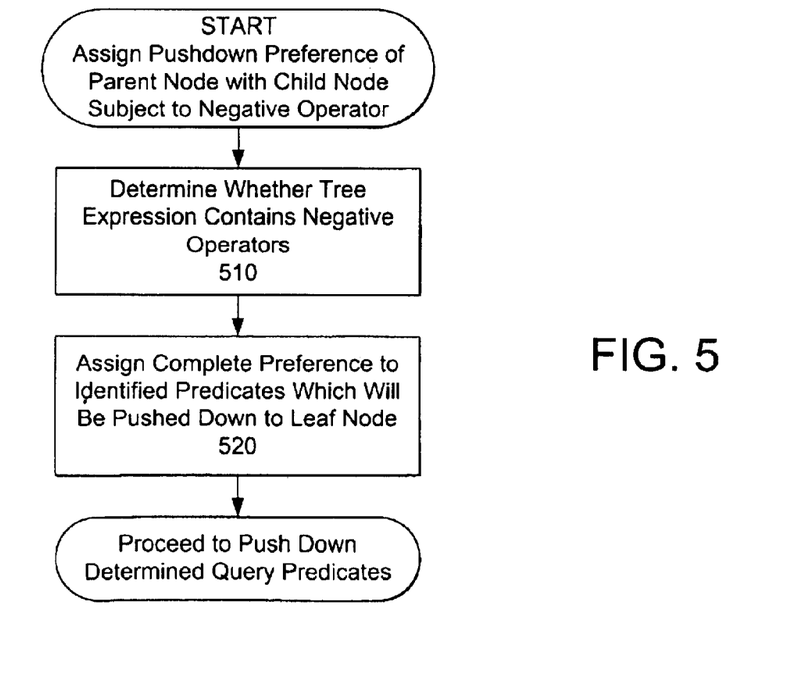
FIG. 5 is a flow diagram illustrating tasks performed by the query pushdown system in identifying a pushdown preference for a query predicate based on the boolean tree representation of a parent node associated with child nodes subject to a conjunctive operator.

FIG. 5 illustrates how the query pushdown system 118 identifies the pushdown preference of a query predicate represented by a parent node such as root node 310 (node A) associated with a child leaf node 330 (node B) and a child non-leaf node 320 (node C). The following cases illustrate child nodes joined by a conjunctive AND operator.

Each child node may or may not be executable in the relational level 120. In addition, a child node may have already been assigned a partial pushdown preference if the child node is a parent of two lower level child nodes. The following chart summarizes the possible permutations of the pushdown preference of parent node A based on the pushdown preference of two child nodes B, C joined by a conjunctive operator:

| Case | Preference-B | Preference-C | Preference-A = B AND C |
|---|---|---|---|
| 1 | Complete | Complete | Complete |
| 2 | Complete | Zero | Partial |
| 3 | Zero | Complete | Partial |
| 4 | Complete | Partial | Partial |
| 5 | Partial | Complete | Partial |
| 6 | Partial | Partial | Partial |
| 7 | Partial | Zero | Partial |
| 8 | Zero | Partial | Partial |
| 9 | Zero | Zero | Zero |

With this system, the query pushdown system 118 can determine the pushdown preference of any parent node anywhere throughout the predicate tree 300 based on any combination of complete, partial, or pushdown preferences of the children nodes.

Continuing with FIG. 5, a flow diagram illustrating a parent node with children nodes associated with a disjunctive operator, in block 510, the query pushdown system 118 determines whether both child nodes B and C are executable in the relational level 120. If both child nodes B and C may be executed in the relational level 120, as in Case 1 above, then the query pushdown system 118 proceeds to block 520. Otherwise, the query pushdown system 118 proceeds to block 540.

In block 520, both child nodes B and C are assigned a "complete" pushdown preference since they may be processed in the relational level 120. With the AND operator, parent node A is also assigned a "complete" pushdown preference in block 530.

If both child nodes B and C are not executable in the relational level 120, then in block 540, the query pushdown system 118 determines whether either of the child nodes can be executed in the relational level 120 or whether either child node has already been assigned a partial pushdown preference. If either child node B or C may be executed in the relational level 120 or has been assigned a partial pushdown preference, then the query pushdown system 118 continues to block 550. Otherwise, the query pushdown system 118 proceeds to block 570.

In block 550, if one of the child nodes B or C may be executed in the relational level 120, then the child node assigned a complete pushdown preference. These situations are illustrated in Cases 2–5 above. As a result, with the AND operator, parent node A is assigned a partial pushdown preference in block 560. In addition, if either child node B or C was already assigned a partial pushdown preference, as in cases 4–8 above, then the parent node A is also assigned a partial pushdown preference based on the AND operator.

In block 570, if neither child node B nor C can be executed in the relational level 120 and if neither child node has been assigned a partial pushdown preference, then both child nodes B and C are assigned a zero pushdown preference since they must be processed in the object level 110. Consequently, with the AND operator, parent node A is also assigned a zero pushdown preference in block 580.

One skilled in the art will recognize that a pushdown determination anywhere in the predicate tree 300 may affect pushdown determinations at a higher level or be propagated throughout the rest of the predicate tree 300. For example, if A=B AND C, and C=D AND E, then the pushdown preferences of D and E which determine the pushdown preference of C, may then impact the pushdown preference of A.

Pushdown Preference Of Query Predicate Represented By Parent Node Associated With Child Nodes Subject To Disjunctive Operator (A=B OR C)

Figure 6:
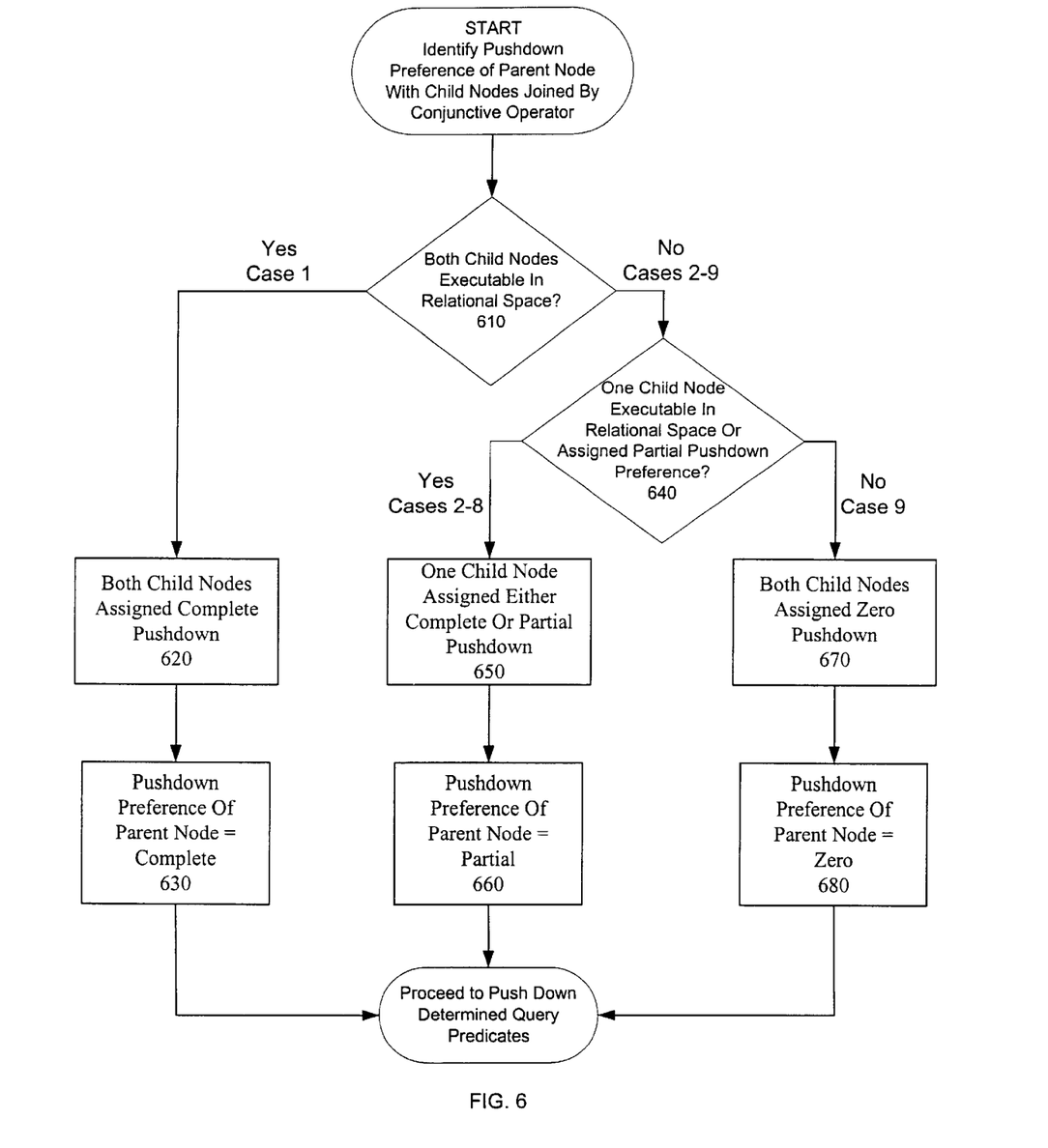
FIG. 6 is a flow diagram illustrating tasks performed by the query pushdown system in identifying a pushdown preference for a query predicate based on the boolean tree representation of a parent node associated with child nodes subject to a disjunctive operator.

FIG. 6 illustrates how the query pushdown system 118 identifies the pushdown preference of a query predicate represented by a parent node such as root node 310 (node A) associated with a child leaf node 330 (node B) and a child non-leaf node 320 (node C). A disjunctive OR operator joins the child nodes. As in the previous examples with the AND operator, each child node may or may not be executable in the relational level 120 or may have already been assigned a partial pushdown preference if a child node is a parent of two lower level child nodes. However, the manner in which these attributes affect the pushdown preference of the parent node differs from the previous examples. The following chart summarizes the possible permutations of the pushdown preference of parent node A based on the pushdown preference of two child nodes B and C joined by a disjunctive operator:

| Case | Preference-B | Preference-C | Preference-A = B OR C |
|---|---|---|---|
| 1 | Complete | Complete | Complete |
| 2 | Complete | Partial | Partial |
| 3 | Partial | Complete | Partial |
| 4 | Partial | Partial | Partial |
| 5 | Complete | Zero | Zero |
| 6 | Zero | Complete | Zero |
| 7 | Partial | Zero | Zero |
| 8 | Zero | Partial | Zero |
| 9 | Zero | Zero | Zero |

With this system, the query pushdown system 118 can determine the pushdown preference of any parent node anywhere throughout the predicate tree 300 based on any combination of complete, partial, or pushdown preferences of the children nodes.

Continuing with FIG. 6, in block 610, the query pushdown system 118 determines whether both child nodes B and C are executable in the relational level 120. If both B and C may be executed in the relational level 120, as in Case 1 above, then the query pushdown system 118 proceeds to block 620. Otherwise, the query pushdown system 118 proceeds to block 640.

In block 620, both child nodes B and C are "complete" pushdown since they may be processed in the relational level 120. With the OR operator, as in the case involving an AND operator, parent node A is also assigned a "complete" pushdown preference in block 630.

In block 640, the query pushdown system 118 determines whether the child nodes B and C are a combination of complete pushdown and partial pushdown preferences. If the child nodes are a combination of complete pushdown and partial pushdown preferences, then the query pushdown system continues to block 650. Otherwise, the query pushdown system continues to block 670.

In block 650, with reference to cases 2–4 above, one child node may have a complete pushdown preference whereas the other child node is assigned a partial pushdown preference or both child nodes may be assigned a partial pushdown preference. In other words, none of the child nodes represent a zero push down preference since it is not necessary to execute them in the object level 110. For example, in case 2 above, child node B may be executable in the relational level 120 and therefore, is assigned a complete pushdown preference. Child node C, however, may have already been assigned a partial pushdown preference if node C was, for example, a parent of two lower level child nodes resulting in a partial pushdown preference. In cases 2–4, the query pushdown system 118 continues to block 660 in which the parent node is assigned a partial pushdown preference based on the pushdown preferences of child nodes B and C and the disjunctive OR operator.

In block 670, corresponding to Cases 5–9, at least one child node must be executed in the object level 110, and thus, is assigned a zero pushdown preference. In these cases, the query pushdown system 118 continues to block 680. In block 680, with the OR operator, the query pushdown system 118 assigns a zero pushdown preference to the parent node although one of the child nodes may have a complete or partial pushdown preference.

It is apparent that a pushdown determination anywhere in the predicate tree 300 may affect pushdown determinations at a higher level or be propagated throughout the rest of the predicate tree 300. For example, if A=B OR C, and C=D OR E, then the pushdown preferences of D and E which determine the pushdown preference of C, may then impact the pushdown preference of A.

Negative Operator Within Leaf Node

If the predicate expression tree 300 has a negative operator in a non-leaf node 320, then the query pushdown system 118 converts the predicate expression tree 300 into an equivalent predicate expression tree such that a negative operator is applied only to leaf nodes 330 rather than non-leaf nodes 320. Those skilled in the art will recognize that any arbitrary predicate calculus expression can be converted into an equivalent expression where the negative operator is applied only to the leaf nodes 330.

In the event that a leaf node 330 is subject a negative operator, the pushdown preference of the leaf node 330 does not change. Rather, the pushdown preference is determined as described above and the negative operator remains associated with the leaf node 330 if the leaf node 330 is processed in the object level 110 or in the relational level 120. For example, if leaf node A is subject to a negative operator, and leaf node A has a complete pushdown preference, then leaf node A subject to a negative operator also has a complete pushdown preference. Similarly, if leaf node A is subject to a negative operator, and leaf node A has a zero pushdown preference, then leaf node A subject to a negative operator also has a zero pushdown preference.

Normalization and Partial Normalization of a Predicate Expression

Continuing with FIG. 4, after describing how the pushdown preferences for the query predicates of an object-oriented query 114 are identified, the query pushdown system 118 continues to block 430. In block 430, the query pushdown system 118 determines which query predicates will be pushed down to the relational level 120 using normalization and partial normalization as described below.

If a predicate expression A, as represented by the root node 300 and lower node relationships, has a complete pushdown preference, then the whole predicate expression can be pushed down to the relational level 120. If the predicate expression has a zero pushdown preference, then the entire query predicate must be executed in the object level 110. However, if the pushdown preference of the root node 300 is partial, then the predicate expression A is converted into an equivalent predicate expression A=B AND C. In the equivalent expression, B has a complete pushdown preference and C has a zero pushdown preference.

In one approach, the predicate expression is normalized into a conjunction of disjunctive terms. For example, a conjunction (i.e., AND) of disjunctive (i.e., OR) terms may be A=(D OR E) AND (F OR G). The pushdown preference of each term can be determined as described above. If a disjunctive term has a complete pushdown preference, then the disjunctive term may be pushed down to the relational level 120. The disjunctive terms can be partitioned into two groups. One group has a complete pushdown preference and the second group has a zero pushdown preference. Thus, the expression A is then equivalent to B AND C where B represents the "AND" of the disjunctive terms with complete pushdown preference, and C represents the "AND" of the disjunctive terms with zero pushdown preference.

In a second approach, the predicate expression is not completely normalized (i.e., this is partial normalization). A part of the expression or a sub-expression is replaced by a new predicate P if the sub-expression has zero or complete pushdown preference. Since P is a single predicate, P does not have to be normalized, and the normalization process is continued with the resulting expression that includes P.

When the normalization process is completed, the result is a normalized predicate expression which may contain several new predicates introduced by the previous procedures. For example, using the first approach described above, the normalized expression may be converted into an expression of A=B AND C where B has complete pushdown preference and C has zero pushdown preference. At this point, in the normalized expression, the query pushdown system 118 substitutes each of the new predicates (e.g., predicate P) with the original sub-expression.

Continuing with FIG. 2, in block 230, after determining which query predicates may be executed in the relational level 120, the query pushdown system 118 pushes the determined query predicates down to the relational level 120. In block 240, the determined predicates 119 are executed in the relational level 120. Executing the determined query predicates 119 generates results 132. In block 250, the results 132 of the query predicate execution and any data sets 134 to be transferred to the object level 110 may be processed before they are returned to the object level 110. Processing the results 132 and data sets 134 facilitates the application of the results 132 and data sets 134 to the remaining query predicates in the object level 110. Examples of post processing include wrapping and/or mapping the results 132 and/or data sets 134 such that they appear as objects in the object level 110. In the case of a complete pushdown scenario, the result 132 is already in an object-oriented form, and thus, may be transferred to the user or client without post-processing. In cases involving partial or zero pushdown preferences, results 132 and/or data sets 134 may need further processing such that they may be recognized as objects.

In block 260, after the determined query predicates 119 have been pushed down, executed, and processed, the results 132 of executing the determined predicates 119 and/or data sets 134 are transferred over the network to the object level 110. In block 270, the original query predicates that were not pushed down to the relational level 120 are then executed by applying any results 132 and data sets 134 to these remaining query predicates. In one embodiment, if A=B AND C and C was pushed down to and executed in the relational level 120, then the results 132 of executing C would then be applied to B.

The forgoing description of the query pushdown system 118 illustrates that more query predicates are pushed down to and executed in the relational level 120 as compared to conventional systems. The query pushdown system 118 overcomes limitations in conventional pushdown systems which only pushdown query predicates if all of the query predicates can be executed in the relational level 120 by using partial normalization and boolean tree representations to separate additional query groups that may be pushed down to and executed in the relational level 120. As a result, more query predicates are executed in the relational level 120, smaller data sets 134 are transferred over the network, and fewer query predicates must be processed in the object level 110. The time to process queries in the object level 110 is minimized, thus improving system performance.

This concludes the description of one embodiment of the invention. The following describes some alternative embodiments for accomplishing the present invention. For example, the query pushdown system 118 may also be utilized in multi-tiered databases 100 comprising more than two levels. For example, a multi-tiered database may comprise any number of levels, and the query pushdown system 118 may be applied to push query predicates from any object level 110 to any relational level 120. In addition, any type of computer, such as a mainframe, minicomputer, or personal computer, or computer configuration, such as the Internet, a local area network, or wide area network, could be used with the present invention.

Conclusion

The foregoing description of one embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a query against a multi-tiered database on a data storage device connected to a computer, the method comprising:

receiving the query at a first level of the multi-tiered database, wherein the first level comprises an object level and the query comprises an object-oriented query that includes one or more query predicates;

at the first level, determining which query predicates can be executed in a second level of the multi-tiered database, wherein the second level comprises a relational level, by converting the query predicates into a boolean predicate tree having one or more parent and child nodes and by identifying a pushdown preference of a parent node based on its child nodes and operators associated with its child nodes, and executing the determined query predicates in the second level.

2. The method of claim 1, wherein executing generates a result.

3. The method of claim 2, further comprising transferring the result from the second level to the first level.

4. The method of claim 3, further comprising transferring, from the second level to the first level a data set associated with a remaining query predicate executable in the first level.

5. The method of claim 2, further comprising applying, in the first level, the result and any transferred data sets to the remaining query predicates.

6. The method of claim 5, before applying the transferred result, further comprising optimizing the remaining query predicates by applying a copy of a determined query predicate to the original query.

7. The method of claim 1, wherein each parent node is associated with one more child nodes.

8. The method of claim 7, wherein determining further comprises identifying a pushdown preference of a parent node based on whether one or more child nodes may be executed in the second level and based on the operators associated with the child nodes.

9. The method of claim 8, wherein the parent node is assigned a complete pushdown preference when a first child node and a second child can be processed in the second level and are joined by a conjunctive operator.

10. The method of claim 8, wherein the parent node is assigned a partial pushdown preference when a first child node can be processed in the second level, a second child node can not be processed in the second level, and wherein the child nodes are joined by a conjunctive operator.

11. The method of claim 8, wherein a parent node is assigned a partial pushdown preference when a first child has been assigned a partial pushdown preference and a second child node can not be processed in the second level, and wherein the child nodes are joined by a conjunctive operator.

12. The method of claim 8, wherein a parent node is assigned a partial pushdown preference when a first child node has been assigned a partial pushdown preference and a second child node can be processed in the second level, and wherein the child nodes are joined by a conjunctive operator.

13. The method of claim 8, wherein a parent node is assigned a partial pushdown preference when a first child node has been assigned a partial pushdown preference and a second child node has been assigned a partial pushdown preference, wherein the child nodes are joined by a conjunctive operator.

14. The method of claim 8, wherein a parent node is assigned a zero pushdown preference when a first child node can not be processed in the second level and a second child node can not be processed in the second level, wherein the child nodes are joined by a conjunctive operator.

15. The method of claim 8, wherein a parent node is assigned a complete pushdown preference when a first child node and a second child can be processed in the second level and are joined by a conjunctive operator.

16. The method of claim 8, wherein the parent node is assigned a partial pushdown preference when a first child node has been assigned a partial pushdown preference and a second node can be processed in the second level, and wherein the child nodes are joined by a disjunctive operator.

17. The method of claim 8, wherein a parent node is assigned a partial pushdown preference when a first child has been assigned a partial pushdown preference and a second child node has been assigned a partial pushdown preference, and wherein the child nodes are joined by a disjunctive operator.

18. The method of claim 8, wherein a parent node is assigned a zero pushdown preference when a first child node can not be processed in the second level and a second child node can not be processed in the second level, and wherein the child nodes are joined by a disjunctive operator.

19. The method of claim 8, wherein a parent node is assigned a zero pushdown preference when a first child node can be processed in the second level and a second child node can not be processed in the second level, and wherein the child nodes are joined by a disjunctive operator.

20. The method of claim 8, wherein a parent node is assigned a zero pushdown preference when a first child node has been assigned a partial pushdown preference and a second child node can not be processed in the second level, and wherein the child nodes are joined by a disjunctive operator.

21. The method of claim 1, wherein determining which query predicates can be executed in the second level further comprises converting the query into a boolean equivalent query by partial normalization.

22. The method of claim 1, wherein determining results in executing all of the query predicates in the first level.

23. The method of claim 1, wherein determining results in executing some of the query predicates in the second level.

24. The method of claim 1, wherein determining results in executing none of the query predicates in the second level.

25. The method of claim 1, wherein the first level comprises an object space.

26. The method of claim 25, wherein the query predicates execute in the object space using an object oriented structured query language.

27. The method of claim 1, wherein the second level comprises a relational space.

28. The method of claim 27, wherein the query predicates execute in the relational space using a relational query language.

29. The method of claim 1, wherein the multi-tiered database environment further comprises one or more additional levels.

30. An apparatus for executing a query against a multi-tiered database comprising:

a computer having a data store connected thereto, wherein the data store stores data; and one or more computer programs, performed by the computer, for receiving the query at a first level of the multi-tiered database, when the first level comprises an object level and the query comprises an object-oriented query that includes one or more query predicates; at the first level, for determining which query predicates can be executed in a second level of the multi-tiered database, wherein the second level comprises a relational level, by converting the query predicates into a boolean predicate tree having one or more parent and child nodes and by identifying a pushdown preference of a parent node based on its child nodes and operators associated with its child nodes; and for executing the determined query predicates in the second level.

31. The apparatus of claim 30, wherein executing generates a result.

32. The apparatus of cairn 31, further comprising transferring the result from the second level to the first level.

33. The apparatus of claim 32, further comprising transferring, from the second level to the first level, a data set associated with a remaining query predicate executable in the first level.

34. The apparatus of claim 31, further comprising applying, in the fist level, the result and any transferred data sets to the remaining query predicates.

35. The apparatus of claim 34, before applying the transferred result, further comprising optimizing the remaining query predicates by applying a copy of a determined query predicate to the original query.

36. The apparatus of claim 30, wherein each parent node is associated with one more child nodes.

37. The apparatus of claim 36, wherein determining further comprises identifying a pushdown preference of a parent node based on whether one or more child nodes may be executed in the second level and based on the operators associated with the child nodes.

38. The apparatus of claim 37, wherein patent node is assigned a complete pushdown preference when a fist child node and a second child can be processed in the second level and are joined by a conjunctive operator.

39. The apparatus of claim 37, wherein the parent node is assigned a partial pushdown preference when a fist child node can be processed in the second level, a second child node can not be processed in the second level, and wherein the child nodes are joined by a conjunctive operator.

40. The apparatus of claim 37, wherein a parent node is assigned a partial pushdown preference when a first child has been assigned a partial pushdown preference and a second child node can not be processed in the second level, and wherein the child nodes are joined by a conjunctive operator.

41. The apparatus of claim 37, wherein a parent node is assigned a partial pushdown preference when a fist child node has been assigned a partial pushdown preference and a second child node can be processed in the second level, and wherein the child nodes are joined by a conjunctive operator.

42. The apparatus of claim 37, wherein a parent node is assigned a partial pushdown preference when a first child node has been assigned a partial pushdown preference and a second child node has been assigned a partial pushdown preference, wherein the child nodes are joined by a conjunctive operator.

43. The apparatus of claim 37, wherein a parent node is assigned a zero pushdown preference when a first child node can not be processed in the second level and a second child node can not be processed in the second level, wherein the child nodes are joined by a conjunctive operator.

44. The apparatus of claim 37, wherein the parent node is assigned a complete pushdown preference when a first child node and a second child can be processed in the second level and are joined by a conjunctive operator.

45. The apparatus of claim 37, wherein the parent node is assigned a partial pushdown preference when a first child node has been assigned a partial pushdown preference and a second node can be processed in the second level, and wherein the child nodes are joined by a disjunctive operator.

46. The apparatus of claim 37, wherein a parent node is assigned a partial pushdown preference when a first child has been assigned a partial pushdown preference and a second child node has been assigned a partial pushdown preference, and wherein the child nodes are joined by a disjunctive operator.

47. The apparatus of claim 37, wherein a parent node is assigned to a zero pushdown preference when a first child node can not be processed in the second level and a second child node can not be processed in the second level, and wherein the child nodes are joined by a disjunctive operator.

48. The apparatus of claim 37, wherein a parent node is assigned a zero pushdown preference when a fist child node can be processed in the second level and a second child node can not be processed in the second level, and wherein the child nodes are joined by a disjunctive operator.

49. The apparatus of claim 37, wherein a parent node is assigned a zero pushdown preference when a first child node has been assigned a partial pushdown preference and a second child node can not be processed in the second level, and wherein the child nodes are joined by a disjunctive operator.

50. The apparatus of claim 30, wherein determining which query predicates can be executed in the second level further comprises converting the query into a boolean equivalent query by partial normalization.

51. The apparatus of claim 30, wherein determermining results in executing all of the query predicates in the first level.

52. The apparatus of claim 30, wherein determining results in executing some of the query predicates in the second level.

53. The apparatus of claim 30, wherein determining results in executing none of the query predicates in the second level.

54. The apparatus of claim 30, wherein the first level comprises an object space.

55. The apparatus of claim 54, wherein the query predicates execute in the object space using an object oriented structured query language.

56. The apparatus of claim 30, wherein the second level comprises a relational space.

57. The apparatus of claim 56, wherein the query predicates execute in the relational space using a relational query language.

58. The apparatus of claim 30, wherein the multi-tiered database environment further comprises one or mote additional levels.

59. An article of manufacture comprising a computer program carrier readable by a computer and embodying one or more instructions executable by the computer to perform steps for executing a query against a multi-tiered database, comprising:
   receiving the query at a first level of the multi-tiered database, here the first level comprises an object level and the query comprises an object-oriented query that includes one or more query predicates;
   at the first level, determining which query predicates can be executed in a second level of the multi-tiered database, wherein the second level comprises a relational level, by converting the query predicates into a boolean predicate tree having one or more parent and child nodes and by indentifying a pushdown preference of a parent node based on its child nodes and operators associated with its child nodes; and
   executing the determined query predicates in the second level.

60. The article of manufacture of 59, wherein executing generates a result.

61. The article of manufacture of claim 60, further comprising transferring the result from the second level to the first level.

62. The article of manufacture of claim 61, further comprising transferring, from the second level to the first level, a data set associated with a remaining query predicate executable in the fist level.

63. The article of manufacture of claim 60, further comprising applying, in the first level, the result and any transferred data sets to the remaining query predicates.

64. The article of manufacture of claim 63, before applying the transferred result, further comprising optimizing the remaining query predicates by applying a copy of a determined query predicate to the original query.

65. The article of manufacture of claim 59, wherein each parent node is associated with one more child nodes.

66. The article of manufacture of claim 65, wherein determining further comprises identifying a pushdown preference of a parent node based on whether one or more child nodes may be executed in the second level and based on the operators associated with the child nodes.

67. The article of manufacture of claim 66, wherein the parent node is assigned a complete pushdown preference when a first child node and a second child can be processed in the second level and ate joined by a conjunctive operator.

68. The article of manufacture of claim 66, wherein the parent node is assigned a partial pushdown preference when a first child node can be processed in the second level, a second child node can not be processed in the second level, and wherein the child nodes are joined by a conjunctive operator.

69. The article of manufacture of claim 66, wherein a parent node is assigned a partial pushdown preference when a first child has been assigned a partial pushdown preference and a second child node can not be processed in the second level, and wherein the child nodes are joined by a conjunctive operator.

70. The ale of manufacture of claim 66, wherein a parent node is assigned a partial pushdown preference when a first child node has been assigned a partial pushdown preference and a second child node can be processed in the second level, and wherein the child nodes are joined by a conjunctive operator.

71. The article of manufacture of dada 66, wherein a parent node is assigned a partial pushdown preference when a first child node has been assigned a partial pushdown preference and a second child node has been assigned a partial pushdown preference, wherein the child nodes are joined by a conjunctive operator.

72. The article of manufacture of claim 66, wherein a parent node is assigned a zero pushdown preference when a first child node can not be processed in the second level and a second child node can not be processed in the second level, wherein the child nodes are joined by a conjunctive operator.

73. The article of manufacture of claim 66, wherein the parent node is assigned a complete pushdown preference when a first child node and a second child can be processed in the second level and are joined by a conjunctive operator.

74. The article of manufacture of claim 66, wherein the parent node is assigned a partial pushdown preference when a first child node has been assigned a partial pushdown preference and a second node can be processed in the second level, and wherein the child nodes are joined by a disjunctive operator.

75. The article of manufacture of claim 66, wherein a parent node is assigned a partial pushdown preference when a first child has been assigned a partial pushdown preference and a second child node has been assigned a partial pushdown preference, and wherein the child nodes are joined by a disjunctive operator.

76. The article of manufacture of claim 66, wherein a parent node is assigned a zero pushdown preference when a first child node can not be processed in the second level and a second child node can not be processed in the second level, and wherein the child nodes are joined by a disjunctive operator.

77. The article of manufacture of claim 66, wherein a parent node is assigned a zero pushdown preference when a first child node can be processed in the second level and a second child node can not be processed in the second level and wherein the child nodes are joined by a disjunctive operator.

78. The article of manufacture of claim 66, wherein a parent node is assigned a zero pushdown preference when a first child node has been assigned a partial pushdown preference and a second child node can not be processed in the second level, and wherein the child nodes are joined by a disjunctive operator.

79. The article of manufacture of claim 59, wherein determining which query predicates can be executed in the second level further comprises converting the query into a boolean equivalent query by partial normalization.

80. The article of manufacture of claim 59, wherein determining results in executing all of the query predicates in the first level.

81. The article of manufacture of claim 59, wherein determining results in executing some of the query predicates in the second level.

82. The article of manufacture of claim 59, wherein determining results in executing none of the query predicates in the second level.

83. The article of manufacture of claim 59, wherein the first level comprises an object space.

84. The article of manufacture of claim 83, wherein the query predicates execute in the object space using an object oriented structured query language.

85. The article of manufacture of claim 59, wherein the second level comprises a relational spaces.

86. The article of manufacture of claim 85, wherein the query predicates execute in the relational space using a relational query language.

87. The article of manufacture of claim 59, wherein the multi-tiered database environment further comprises one or more additional levels.

* * * * *

UNITED STATES PATENT AND TRADEMARK OFFICE
CERTIFICATE OF CORRECTION

PATENT NO.    : 6,748,377 B1
DATED         : June 8, 2004
INVENTOR(S)   : Gopi K. Attaluri It is certified that error appears in the above-identified patent and that said Letters Patent is hereby corrected as shown below:

Column 12,
Line 56, "database" should read -- computer environment --.

Column 14,
Line 52, "when" should read -- wherein --.

Column 15,
Lines 20, 24 and 35, "fist" should read -- first --.

Column 16,
Line 39, "mote" should read -- more --.
Line 47, "here" should read -- wherein --.

Column 17,
Line 18, "ate" should read -- are --.
Line 31, "ale" should read -- article --.
Line 37, "dada" should read -- claim --.

Column 18,
Line 44, "spaces" should read -- space --.

Signed and Sealed this

First Day of February, 2005

JON W. DUDAS
*Director of the United States Patent and Trademark Office*